United States Patent
Gerdes

(10) Patent No.: US 9,486,816 B2
(45) Date of Patent: Nov. 8, 2016

(54) VARIABLE SPRINKLER ORIFICE DEVICE

(71) Applicant: Valmont Industries, Inc., Omaha, NE (US)

(72) Inventor: Jerry Gerdes, Omaha, NE (US)

(73) Assignee: Valmont Industries, Inc., Omaha, NE (US)

( * ) Notice: Subject to any disclaimer, the term of this patent is extended or adjusted under 35 U.S.C. 154(b) by 0 days.

(21) Appl. No.: 14/718,887

(22) Filed: May 21, 2015

(65) Prior Publication Data

US 2015/0336116 A1    Nov. 26, 2015

Related U.S. Application Data

(60) Provisional application No. 62/002,010, filed on May 22, 2014.

(51) Int. Cl.
| F16K 3/08 | (2006.01) |
| B05B 1/16 | (2006.01) |
| B05B 1/12 | (2006.01) |
| A01G 25/09 | (2006.01) |

(52) U.S. Cl.
CPC ........... B05B 1/1636 (2013.01); A01G 25/092 (2013.01); B05B 1/12 (2013.01); F16K 3/085 (2013.01)

(58) Field of Classification Search
CPC ... B05B 1/1636; B05B 1/1672; B05B 1/169; F16K 3/08; F16K 3/085
USPC ........ 239/443, 469, 497; 137/625.43, 625.46
See application file for complete search history.

(56) References Cited

U.S. PATENT DOCUMENTS

| | | | | |
|---|---|---|---|---|
| 1,607,827 A | * | 11/1926 | Herrmann | F16K 3/085 251/174 |
| 1,738,135 A | * | 12/1929 | Bannister | F16K 3/085 137/625.31 |
| 3,026,899 A | * | 3/1962 | Mischanski | F16K 3/085 137/375 |
| 4,554,948 A | * | 11/1985 | Bergmann | F16K 3/085 137/625.31 |
| 4,674,537 A | * | 6/1987 | Bergmann | F16K 3/085 137/625.31 |
| 5,417,083 A | * | 5/1995 | Eber | F16K 3/085 251/129.11 |
| 6,666,384 B2 | * | 12/2003 | Prandi | A01G 25/16 239/1 |
| 8,166,992 B2 | * | 5/2012 | Samaroo | B09C 1/002 137/1 |
| 8,210,205 B2 | * | 7/2012 | Michaels | F16K 11/087 137/625.43 |
| 8,974,201 B2 | * | 3/2015 | Oulman | F04B 7/0046 137/625.31 |
| 2002/0005443 A1 | * | 1/2002 | Drechsel | A01G 25/092 239/728 |
| 2004/0007008 A1 | * | 1/2004 | Benatav | F25B 41/046 62/324.6 |
| 2004/0123911 A1 | * | 7/2004 | Bartkus | F16K 11/0743 137/625.46 |
| 2008/0078461 A1 | * | 4/2008 | Danel | F16K 11/074 137/625.19 |
| 2011/0248104 A1 | * | 10/2011 | Malsam | A01G 25/092 239/723 |
| 2012/0192954 A1 | * | 8/2012 | Jorgenson | F16K 3/085 137/2 |
| 2014/0252140 A1 | * | 9/2014 | Stewart | A01C 23/04 239/722 |
| 2015/0204455 A1 | * | 7/2015 | Zimmer | F16K 31/08 251/65 |

* cited by examiner

Primary Examiner — Arthur O Hall
Assistant Examiner — Joseph A Greenlund
(74) Attorney, Agent, or Firm — David H. Milligan PC LLO

(57) ABSTRACT

The present invention includes a variable sprinkler orifice device that can change orifice sizes using a rotating disk with multiple orifices along the circumference of the disk. According to first preferred embodiment, the implement preferably includes a conduit in which water is directed through a series of rotatable plates which preferably include incrementally sized orifices. According to a further preferred embodiment, the variable orifices are automatically and quickly adjusted based on VRI data to change the combination of orifices used.

1 Claim, 7 Drawing Sheets

VARIABLE SPRINKLER ORIFICE DEVICE

FIELD OF INVENTION

The present invention is related in general to the field of irrigation and, in particular, to an apparatus and method for automatically adjusting the orifice size of an irrigation nozzle based on determined field conditions.

BACKGROUND OF THE INVENTION

Variable Rate Irrigation (VRI) allows users to apply specific amounts of water to predefined sections of irrigated fields. In use, VRI relies upon a combination of hardware and software which determines water application patterns based on topography information, soil data maps, yield data and the like. Using VRI, the amount of water applied to each section of a field is controlled for varying crop types and soil types. Because of this, users are able to save water and fertilizer/chemical costs in their farming operations while maximizing the irrigation benefits from a given amount of water.

A key aspect of VRI is the control of water application rates/depths for specific areas of a given field. Applying VRI, there are primarily two methods for varying water application depths applied by center pivot or linear irrigation equipment. One is to vary the speed of the irrigation span thereby changing the water application depth for a segment of the field. For instance, reducing the irrigation span speed by 50% will double the water application depth beneath the entire span for a given area. The second method requires the control of sprinklers individually or in groups (zones) using hydraulic valves. Using the second method, sprinkler zones are turned on/off (pulsing) using computer software control algorithms which are able to change the water application depth within individual zones. For example, using a cycle time of 50% (sprinkler valve open for 50% and closed for 50% of time period) will reduce the water application depth for a given area by 50%.

The ability to control water application levels using either speed or sprinkler zone control is limited. With respect to speed control, changing the speed of an irrigation span for one area of a field necessarily requires that the speed of the entire length of the span be changed. Accordingly, since field soil types vary along the irrigation span, compromises must be made to best match application depths of a given area.

With respect to pulsing sprinklers, lag time between the signal to close/open a valve and when the valve actually closes/opens can be inconsistent throughout an irrigation event causing variations in water application depths. Further, cycle times are also limited based on the movement of the machine. If the off time portion of the cycle time is too long, the water application depths will be incorrect.

What is needed is a system to provide precise control of the water application depth in an irrigation system. Further, what is needed is a control system which is responsive to continual changes and which can make adjustments in the water application depth with very little lag time. Finally, what is needed is a control system which can control the water application depth under different water pressure conditions. The present invention overcomes the short comings of the prior art by accomplishing these critical objectives.

SUMMARY OF THE DISCLOSURE

To minimize the limitations found in the prior art and other limitations that will be apparent upon the reading of the specification, the preferred embodiment of the present invention provides a variable sprinkler orifice device that can change sprinkler orifice sizes using a rotating disk with multiple orifices along the circumference of the disk.

According to a first preferred embodiment, the present invention discloses a nozzle implement which is designed to replace or enhance standard sprinkler nozzles of the prior art. The implement includes a conduit in which water is directed through a series of rotatable plates. Each rotatable plate preferably includes incrementally sized orifices. The variable orifices are automatically and quickly adjusted based on VRI data to change the combination of orifices used.

According to a further preferred embodiment of the present invention, water pressure is monitored below each variable orifice plate. Further, a computer program algorithm is used to control the variable orifice devices. According to a further aspect of the present invention, the line pressures upstream and downstream of the second variable orifice device are monitored and used to control the variable orifice devices.

These and other advantages and features of the present invention are described with specificity so as to make the present invention understandable to one of ordinary skill in the art.

BRIEF DESCRIPTION OF THE DRAWINGS

Elements in the figures have not necessarily been drawn to scale in order to enhance their clarity and to improve the understanding of the various elements and embodiments of the invention. Furthermore, elements that are known to be common and well understood to those in the industry are not depicted in order to provide a clear view of the various embodiments of the invention. Thus, it should be understood that the drawings are generalized in form in the interest of clarity and conciseness.

DETAILED DESCRIPTION OF THE DRAWINGS

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

Figure 1:
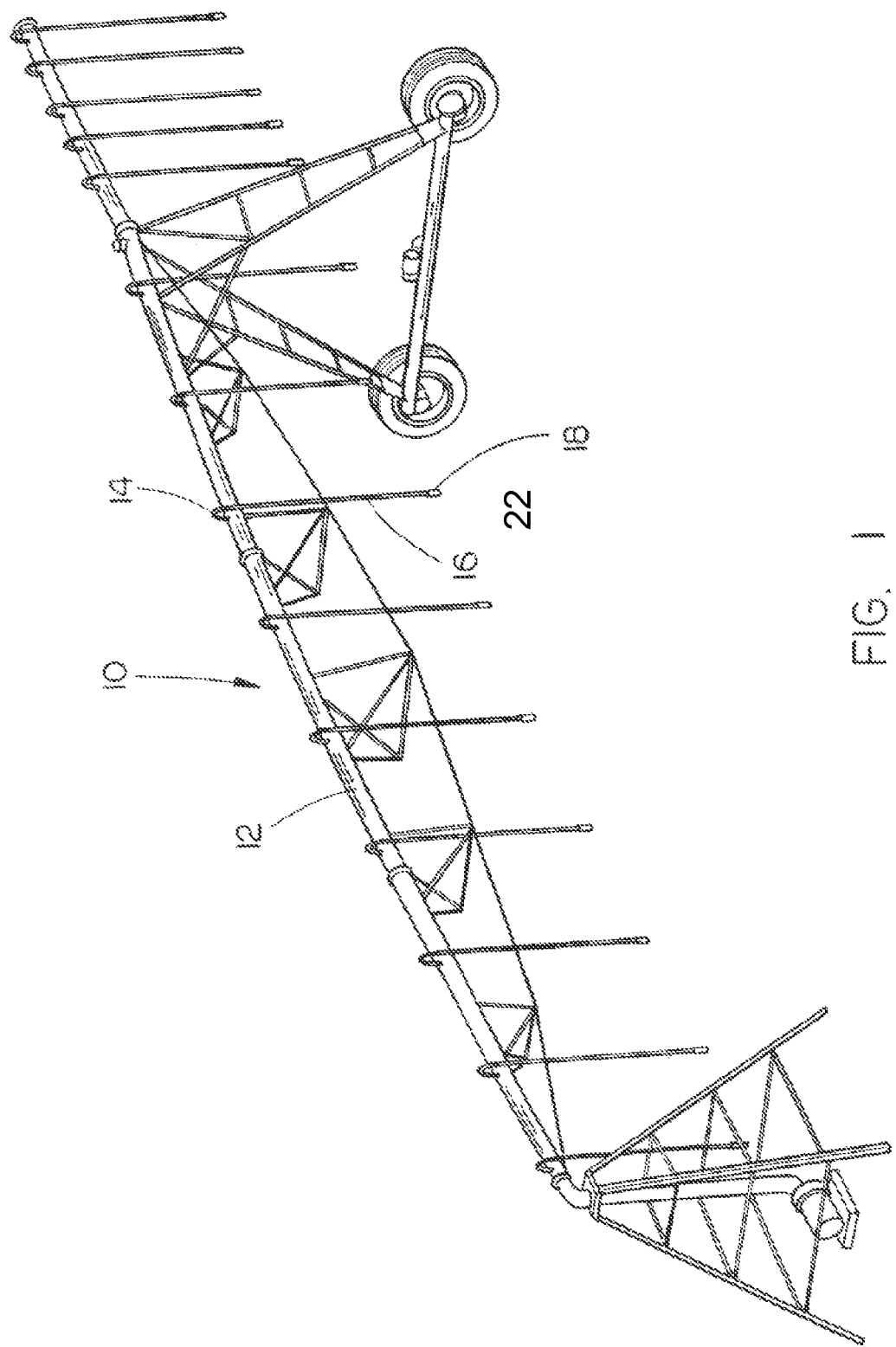
FIG. 1 shows a standard field irrigation system as known in the prior art.

FIG. 1 illustrates an exemplary center irrigation span 10 in accordance with the prior art. As shown, irrigation span 10 includes a water supply pipe 12 which extends out for irrigating a length of field. To distribute water, water supply pipe 12 includes a series of pipes 14 which extend towards the ground via drop tubes 16 which are attached to a nozzle 18 for directing and applying water.

With respect to FIG. 2, an exemplary variable nozzle assembly 20 of the present invention will now be discussed. As illustrated, the rotational disks 24, 34 and 42 (also referred to as variable orifices or plates) are shown enlarged and partially outside of the nozzle tube 23. In this embodiment, the rotational disks may preferably be sealed within a larger protective tube 21 and rotated through the water flow within the nozzle tube 23. Alternatively, the rotational disks 24, 34 and 42 may be located within the nozzle tube 23 and incorporate a rotating covering mechanism or the like to select a single orifice to be opened while covering the non-selected orifices.

Figure 2:
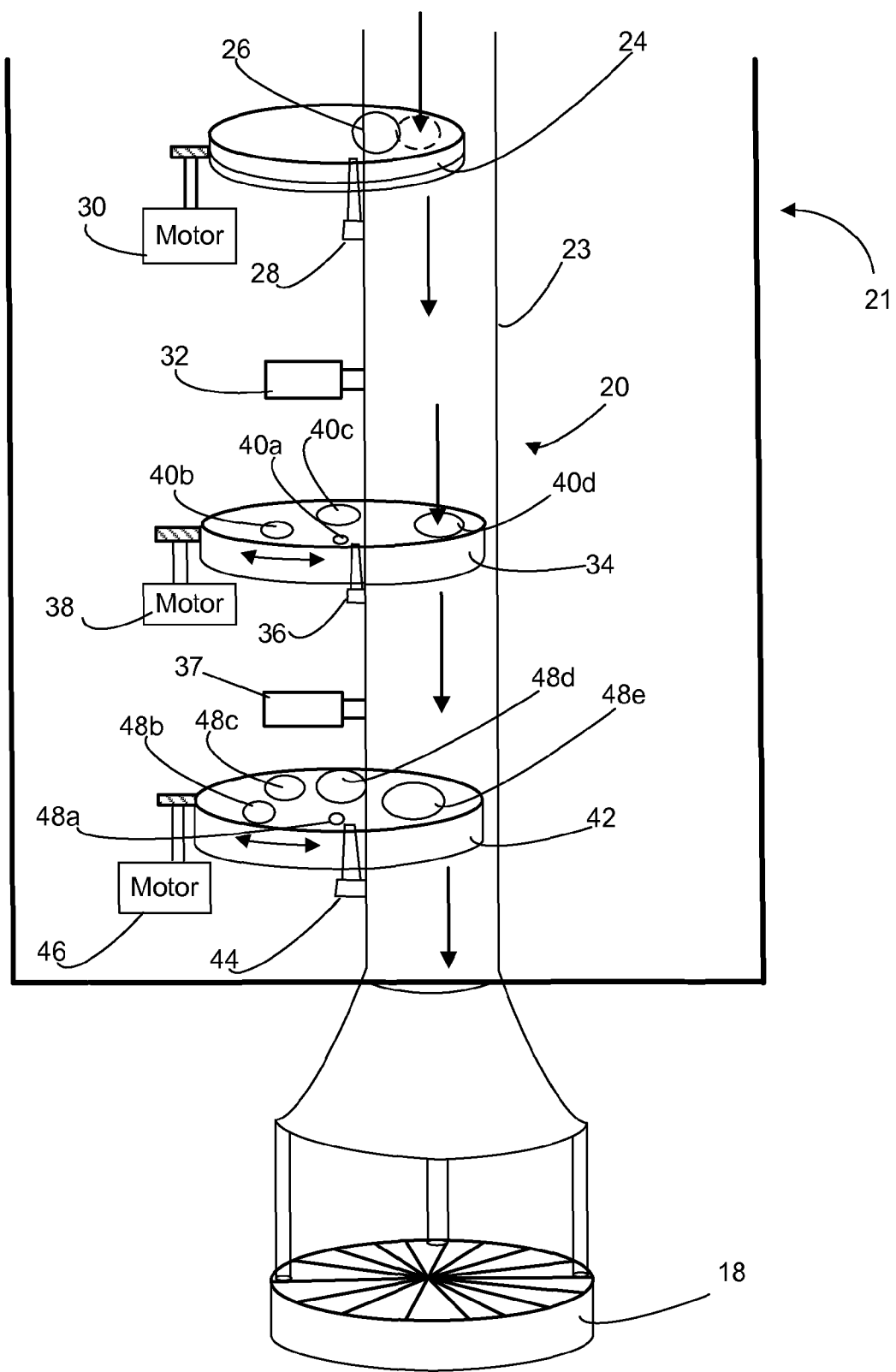
FIG. 2 shows an exemplary variable orifice nozzle assembly of the present invention.

As further shown in FIG. 2, water is preferably forced under pressure through the top of nozzle tube 23 and forced out of sprinkler head 18. According to a first preferred embodiment, a first rotating disk 24 is preferably provided at a first section of the nozzle tube 23 with an orifice 26. As shown, the first rotating disk 24 is preferably rotated on a rotating element 28 via a motor 30. According to a further preferred embodiment, a second rotating disk 34 is preferably further provided in a second section of the nozzle tube 23 with selectable orifices 40a-40d. As shown, the second rotating disk 34 is preferably rotated on a rotating element 36 via a motor 38. According to a further preferred embodiment, a third rotating disk 42 is preferably further provided in a third second section of the nozzle tube 23 with selectable orifices 48a-48e. As shown, the third rotating disk 42 is preferably rotated on a rotating element 44 via a motor 46. As further shown in FIG. 2, pressure monitors 32 and 37 are preferably provided to monitor and report on water pressure within the nozzle tube 23 as will be discussed with respect to FIG. 7 below.

With respect to the motorized elements of FIG. 2, the motors 30, 38 and 46 may preferably be an AC induction motor, a brushed or brushless DC motor, an AC Synchronous motor, a stepping motor, a universal motor, a piezoelectric motor or any suitable motor for reliably turning a disk into the flow of water.

Figure 3:
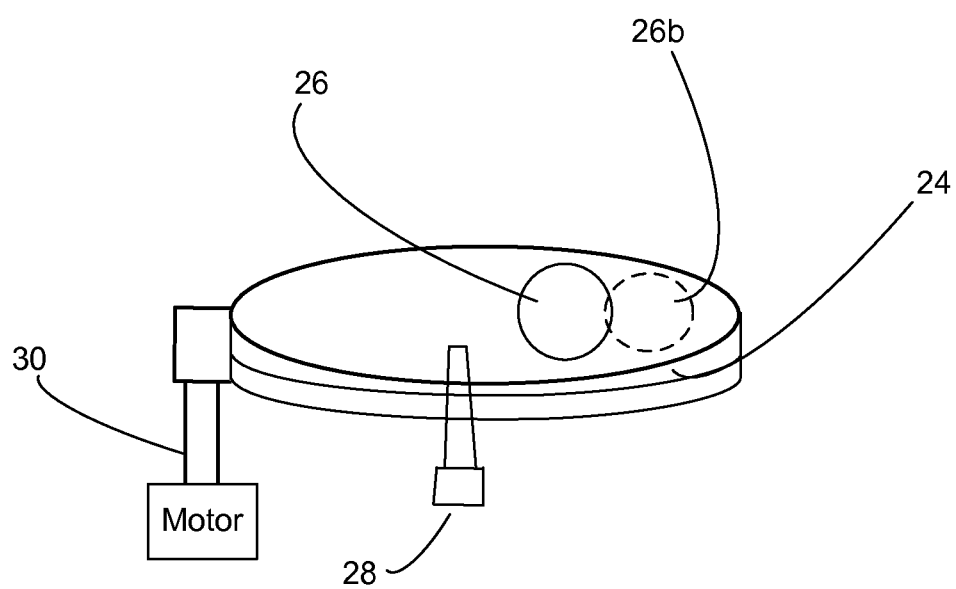
FIG. 3 shows an exemplary first motorized variable sprinkler orifice disk of the present invention.

With reference now to FIG. 3, a first exemplary rotating disk 24 will now be discussed. As shown, rotating disk 24 preferably includes an orifice 26 which is rotatable via motor 30 and rotating element 28 from a first position (where orifice 26 is open to the flow of water within nozzle tube 23) and a second position 26b (where the orifice 26 is removed from or closed to the flow of water).

Figure 4:
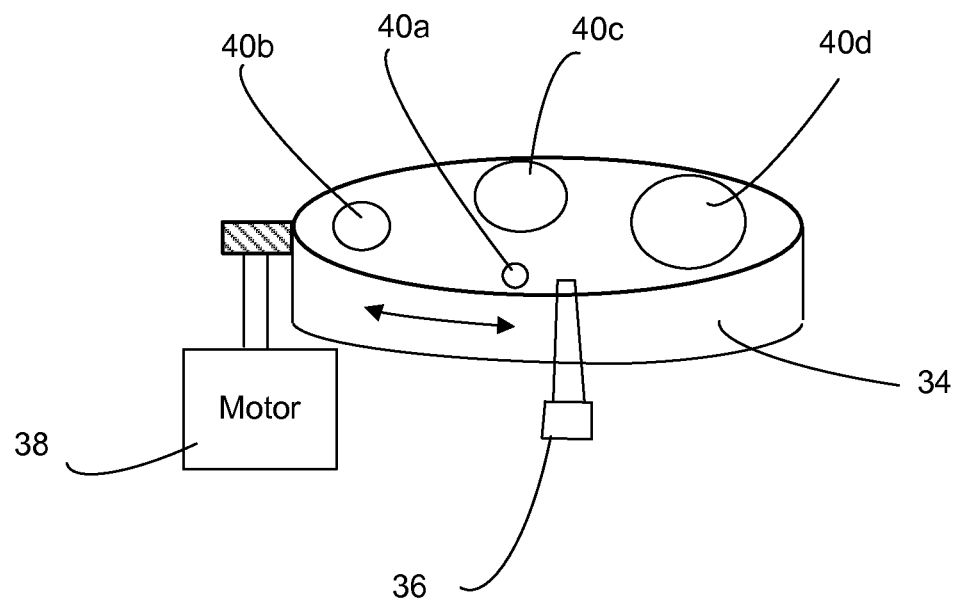
FIG. 4 shows an exemplary a second motorized variable sprinkler orifice disk of the present invention.

With reference now to FIG. 4, a second exemplary rotating disk 34 will now be discussed. As shown, rotating disk 34 preferably includes orifices 40a, 40b, 40c and 40d which vary in diameter from small to large and which are rotatable via motor 38 and rotating element 36 to separately positioning one of the orifices (for example 40a) within the flow of water while removing or closing off the other non-selected orifices (for example 40b-40d) from the flow of water.

Figure 5:
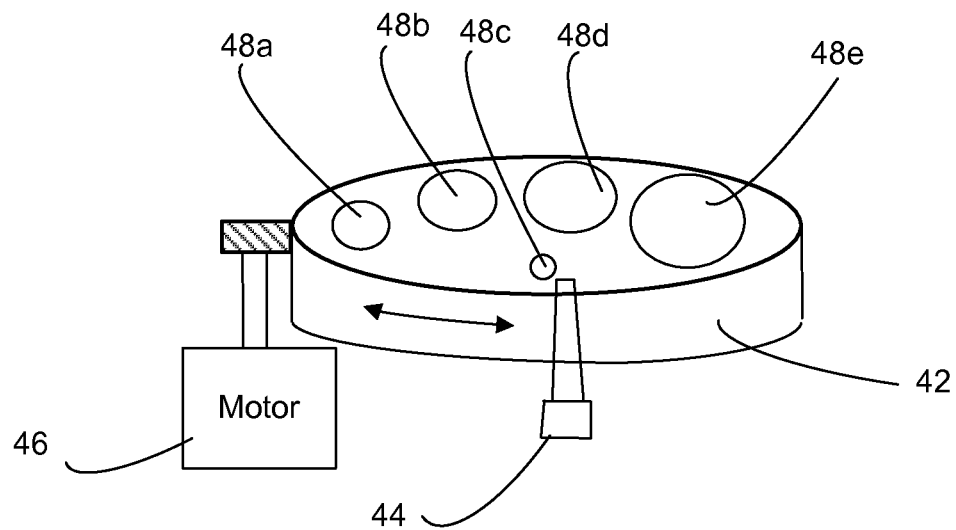
FIG. 5 shows an exemplary third motorized variable sprinkler orifice disk of the present invention.

With reference now to FIG. 5, a third exemplary rotating disk 42 will now be discussed. As shown, rotating disk 42 preferably includes orifices 48a, 48b, 48c, 48d and 48e which vary in diameter from small to large and which are rotatable via motor 46 and rotating element 44 to separately positioning one of the orifices (for example 48a) within the flow of water while removing or closing off the other non-selected orifices (for example 48b-48e) from the flow of water.

According to a further preferred embodiment, any one of the rotating disks may be alternatively fixed in place depending on the consistent needs of the system. In such embodiments, any combination of fixed and adjustable disks may be used.

Figure 6:
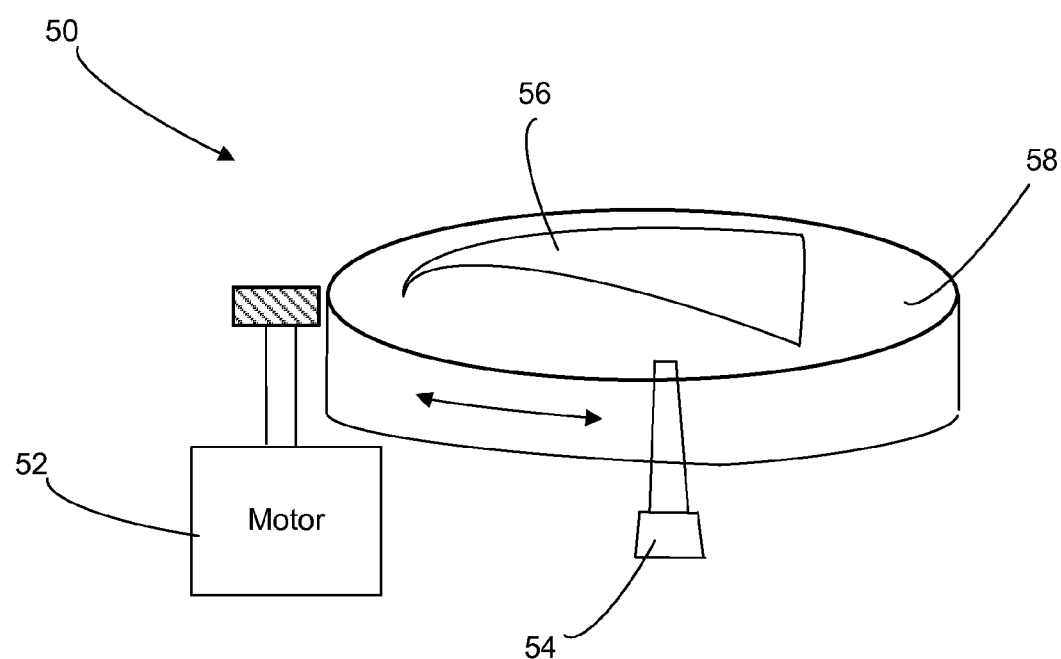
FIG. 6 shows an exemplary alternative motorized variable sprinkler orifice disk according to a further aspect of the present invention.

With reference now to FIG. 6, an alternative exemplary rotating disk 48 will now be discussed. As shown, rotating disk 58 preferably includes a single variable orifice 56 which varies from a narrow point to a wide point. According to an alternative preferred embodiment, the disk 58 may be used in place of one or more of the disks 24, 34, or 42 to control water flow. Preferably, disk 58 may be rotatable via motor 52 and rotating element 54 to positioning a section of variable orifice 56 within the flow of water while removing or closing off the other non-selected portions of orifice 56 from the flow of water. By positioning various sections of the variable orifice 56 within the flow of water, different volumes of water can be allowed to pass through the disk 58.

Figure 7:
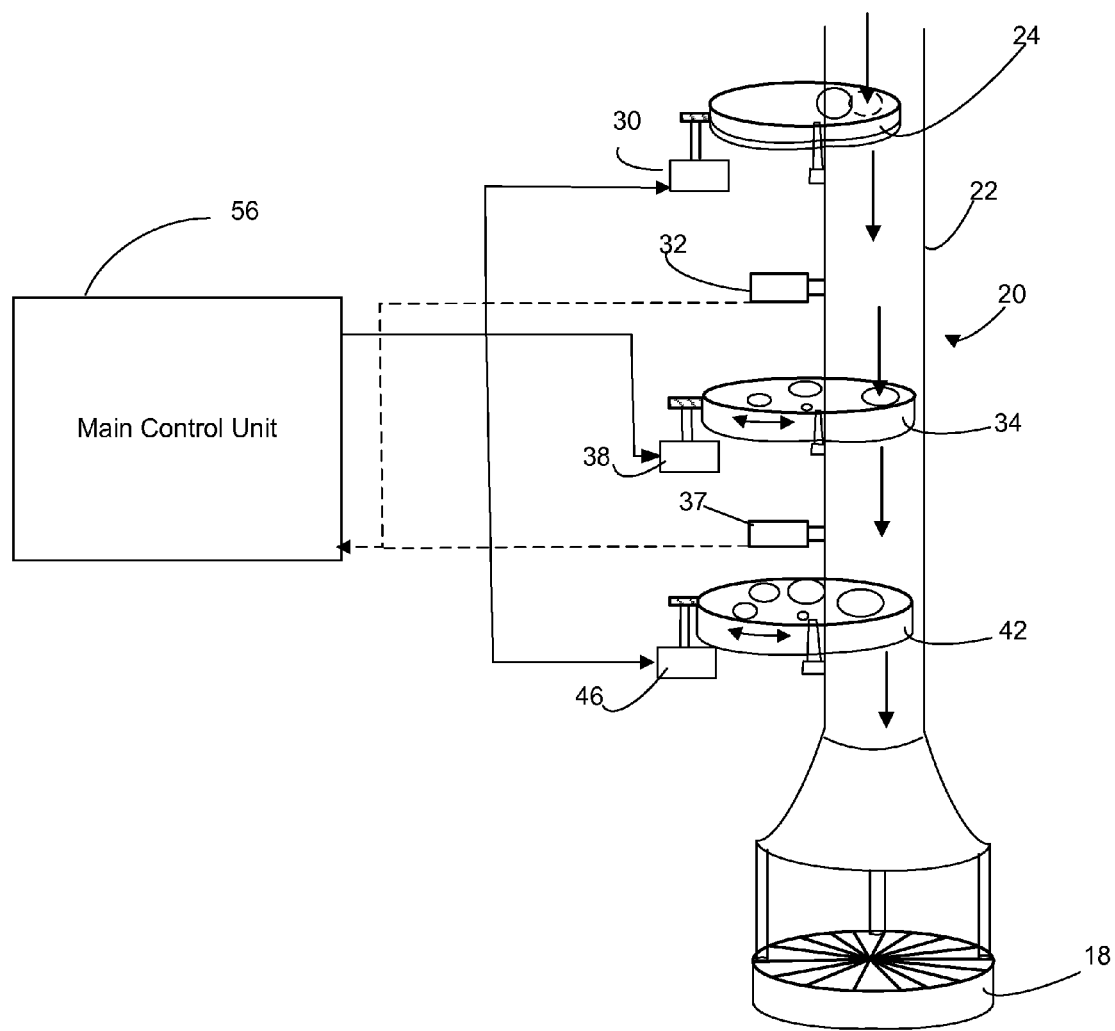
FIG. 7 shows an exemplary embodiment illustrating the control and feedback system of the present invention.

With reference now to FIG. 7, the operation of an exemplary embodiment 20 of the present invention will now be discussed. In operation, the system of the present invention is designed to adjust the flow of water through a sprinkler head 18 in a controlled manner. Specifically, the system of the present invention works through a series of rotatable disks 24, 34, and 42 which are adjustable via a feedback and control system. In the example shown, pressure readings are taken via pressure monitors 32, 37 at a variety of points within the nozzle tube 23. Preferably, these readings are provided back to a main control unit (MCU) 56 which may then use these readings to calculate the actual water flow rate through the sprinkler head 18. Further, the main control unit is preferably configured to calculate a target flow rate based on a VRI water application map determined based on topography information, soil data maps, yield data, and/or other related information. Once calculated, the MCU 56 preferably determines the appropriate settings for each rotatable disk to achieve the target flow rate through the sprinkler head 18. Further, the MCU may preferably calculate the quickest and most efficient adjustment of the disks 24, 34, and 42 to eliminate lag time. Once calculated, the MCU preferably instructs the motors 30, 38 and 46 to adjust each disk 24, 34 and 42 so that the correct combination of orifices are within the flow of water to produce the target application rate. As water is supplied, the MCU preferably makes continual adjustments to the disks 24, 34 and 42 based on continual pressure readings and changes in the location of the sprinkler head with respect to the VRI water application map.

As shown, FIG. 7, the water pressure is monitored below each variable disk. Alternatively, the water pressure may be monitored at any point within the water supply system. Further, the system and disks of the present invention are shown primarily within a nozzle tube. However, the present invention may be used in any of a variety of conduits such as a main supply pipe, a drop tube or in the sprinkler head.

According to further alternative aspects of the present invention, the powered elements of the present invention may be solar powered, battery powered, hardware powered or powered by any other conventional means. Further, the communication between the communication elements of the present invention may preferably be made via wired or wireless connection. Further, the signals may be transmitted to a wireless relay, base station or the like for routing and transmission to a chosen centralized location independent from or in combination with the transmissions made from the wired or wireless system.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

What is claimed is:

1. A variable sprinkler orifice device, wherein the variable sprinkler orifice device operates to control the flow of water through a water supply pipe to a nozzle, wherein the device comprises:
   a first plate, wherein the first plate is comprised of at least a first selectable orifice; wherein the first plate is rotatably mounted to move between at least a first position and a second position; wherein when the first plate is turned to the first position, the first selectable orifice is within the water flow of the water supply pipe; further wherein when the first plate is turned to the second position, the first selectable orifice is not within the water flow of the water supply pipe;
   a first motor for rotating the first plate between the first position and the second position;
   a second plate, wherein the second plate is downstream from the first plate, further wherein the second plate is comprised of at least a second selectable orifice and a third selectable orifice; wherein the second plate is rotatably mounted to move between at least a first position and a second position; wherein when the second plate is turned to the first position, the second selectable orifice is within the water flow of the water supply pipe and the third selectable orifice is not within the water flow; further wherein when the second plate is turned to the second position, the third selectable orifice is within the water flow of the water supply pipe and the second selectable orifice is not within the water flow of the water supply pipe;
   a second motor for rotating the second plate between the first position and the second position;
   a first sensor, wherein the first sensor is a water pressure sensor; further wherein the first sensor is located between the first plate and the second plate;
   a third plate, wherein the third plate is downstream from the second plate, further wherein the third plate is comprised of at least a fourth selectable orifice and a fifth selectable orifice; wherein the third plate is rotatably mounted between at least a first position and a second position; wherein when the third plate is turned to the first position, the fourth selectable orifice is within the water flow of the water supply pipe and the fifth selectable orifice is not within the water flow of the water supply pipe; further wherein when the third plate is turned to the second position, the fifth selectable orifice is within the water flow of the water supply pipe and the fourth selectable orifice is not within the water flow of the water supply pipe;
   a third motor for rotating the third plate between the first position and the second position;
   a second sensor; wherein the second sensor is a water pressure sensor; further wherein the second sensor is located between the second plate and the third plate; and
   a controller, wherein the controller is configured to receive water pressure data from the first sensor and the second sensor; further wherein the controller is configured to calculate the water flow rate through the nozzle based on the water pressure data;
   further wherein the controller is configured to calculate a target flow rate based on a water application map for a selected area;
   further wherein the controller is configured to selectively instruct the first, second and third motors to respectively rotate the first plate, the second plate and the third plate to adjust the real-time water flow rate through the nozzle to match the target flow rate.

* * * * *